(12) United States Patent
Ono

(10) Patent No.: US 8,593,685 B2
(45) Date of Patent: Nov. 26, 2013

(54) IMAGE PROCESSING APPARATUS AND COLOR DEVIATION ADJUSTMENT CONTROL METHOD

(75) Inventor: Shunichi Ono, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 369 days.

(21) Appl. No.: 13/040,639

(22) Filed: Mar. 4, 2011

(65) Prior Publication Data

US 2011/0216336 A1 Sep. 8, 2011

Related U.S. Application Data

(60) Provisional application No. 61/310,979, filed on Mar. 5, 2010.

(51) Int. Cl.
*G06K 1/00* (2006.01)
*G03G 15/00* (2006.01)
*B41J 29/393* (2006.01)

(52) U.S. Cl.
USPC ............... 358/1.9; 358/2.1; 358/504; 399/49; 399/66; 347/19; 347/37

(58) Field of Classification Search
None
See application file for complete search history.

(56) References Cited

U.S. PATENT DOCUMENTS

| 7,103,290 B2 * | 9/2006 | Koie et al. ......... 399/15 |
| 8,305,627 B2 * | 11/2012 | Ikeda ............ 358/1.18 |
| 2003/0202810 A1 * | 10/2003 | Udaka et al. ........ 399/49 |

FOREIGN PATENT DOCUMENTS

| JP | 2007155971 | 6/2007 |
| JP | 2010048904 | 3/2010 |

* cited by examiner

*Primary Examiner* — Steven Kau
(74) *Attorney, Agent, or Firm* — Turocy & Watson, LLP

(57) ABSTRACT

An image processing apparatus includes an image forming unit, an adjustment unit, an image control unit, a sensor, a deviation amount calculating unit, and a determination unit. The image forming unit forms an image. The adjustment unit forms one set of a plurality of predetermined images in color, and adjusts color deviation. The image control unit controls the image forming unit to form a lesser number of predetermined images than the number of predetermined images formed by the adjustment unit. The sensor detects the predetermined images formed on the basis of control of the image control unit by the image forming unit. The deviation amount calculating unit calculates a deviation amount on the basis of the predetermined images. The determination unit determines whether or not color deviation occurs on the basis of the deviation amount, and controls performance of the adjustment unit on the basis of the determination result.

18 Claims, 10 Drawing Sheets

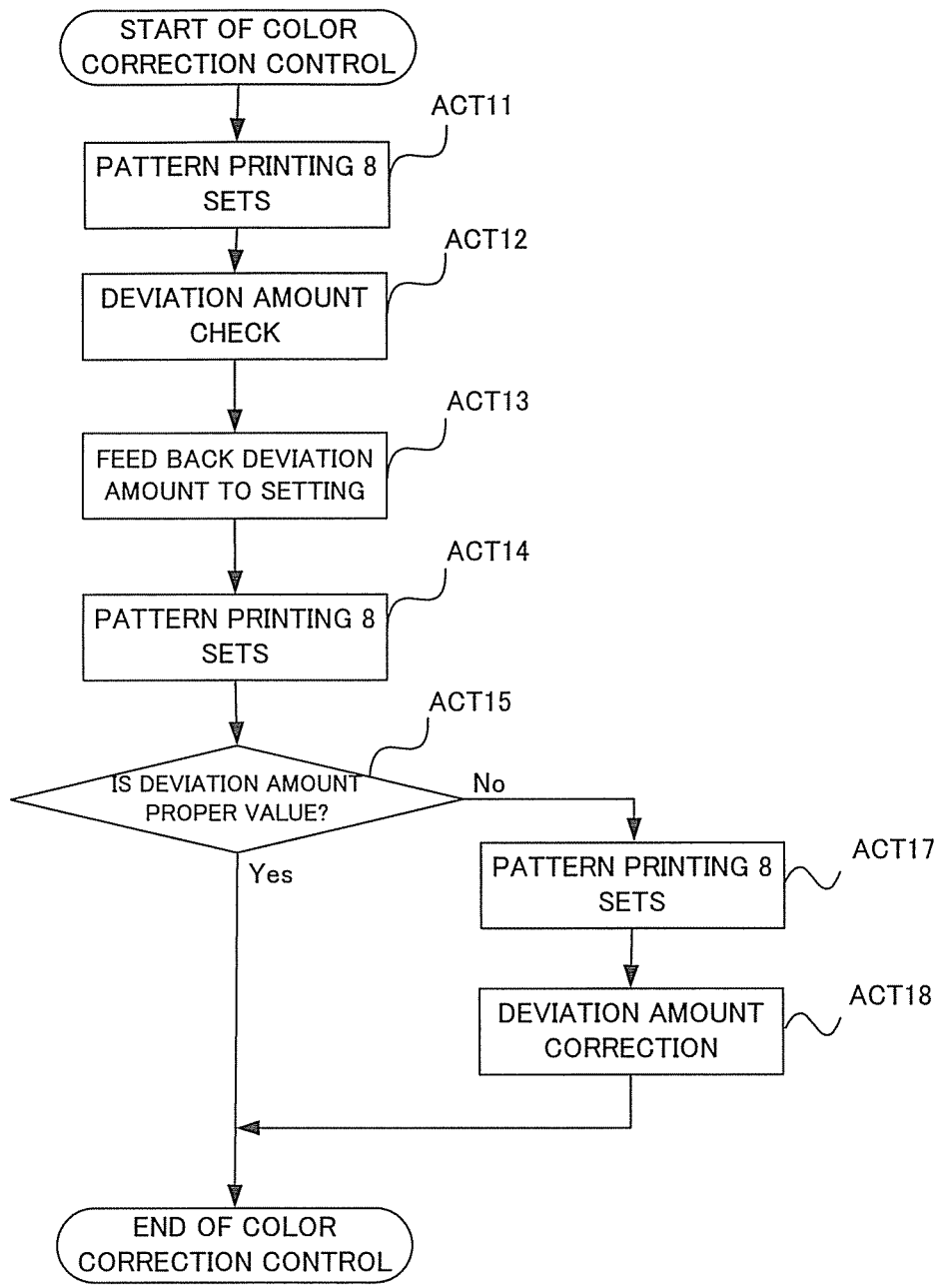

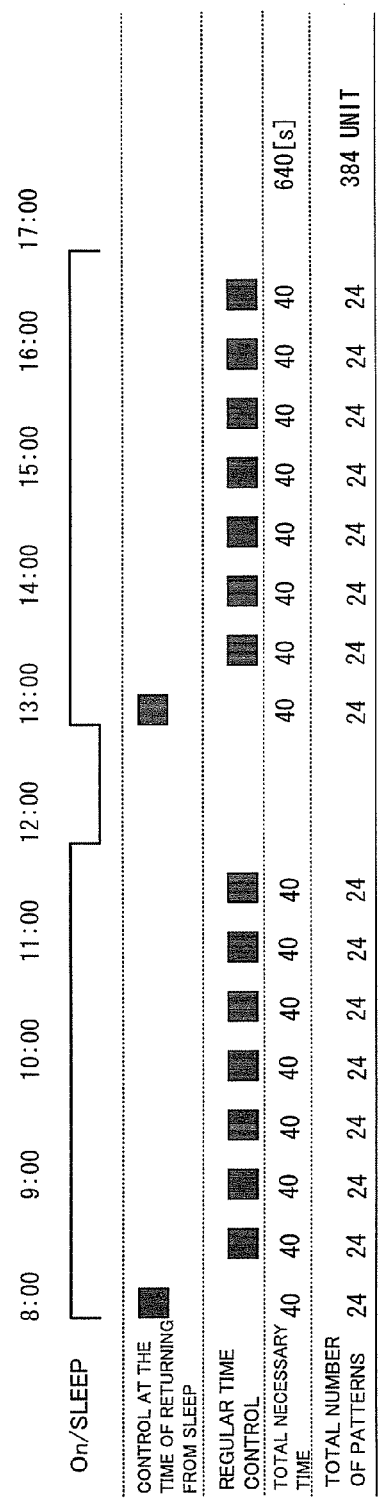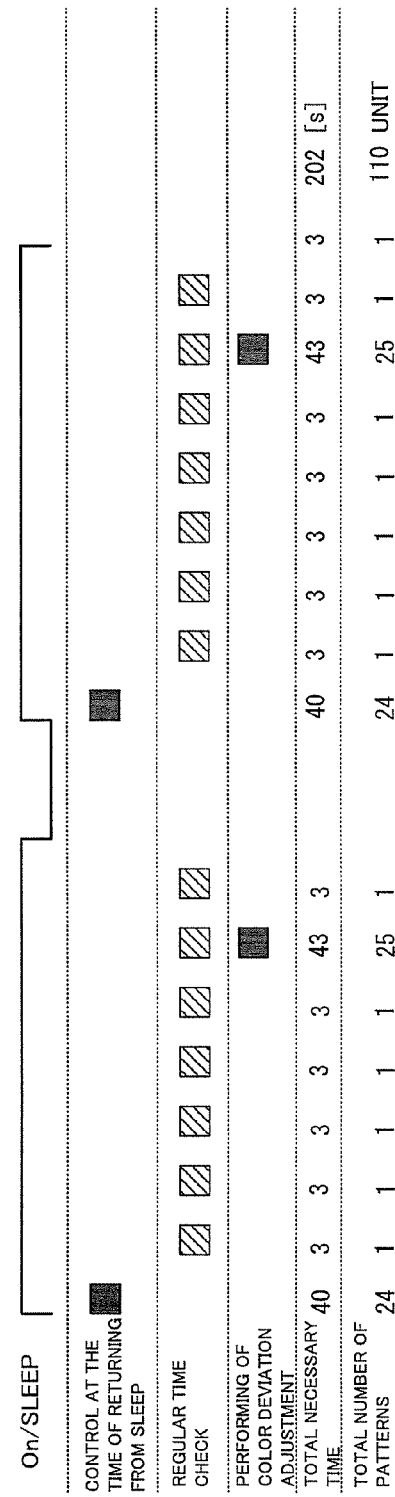

IMAGE PROCESSING APPARATUS AND COLOR DEVIATION ADJUSTMENT CONTROL METHOD

CROSS-REFERENCE TO RELATED APPLICATION

This application is based upon and claims the benefit of priority from: U.S. provisional application 61/310,979, filed on Mar. 5, 2010; the entire contents all of which are incorporated herein by reference.

FIELD

The present invention relates to a color deviation adjusting technique of an image processing apparatus.

BACKGROUND

Conventionally, in the color deviation (which means that each color does not overlap) adjusting technique of the image processing apparatus, the deviation amount of colors is calculated from a predetermined color deviation amount detecting pattern (hereinafter, referred to as a pattern) formed for each station of four colors of yellow, magenta, cyan, and black, and the color deviation is adjusted and controlled on the basis of information of the amount of color deviation.

In the color deviation adjustment, when a pattern of one color of yellow, magenta, cyan, and black is one set, a plurality of sets are printed, and a pattern detecting process and an adjustment process are repeatedly performed a plurality of times.

The color deviation adjustment is performed at the timing other than that of a printing job of a user according to a predetermined condition, such as when the image processing apparatus is returned from a sleep state or when a predetermined period elapses. Accordingly, the color deviation adjustment process may be performed in the course of performing a process of the currently performed job or may be performed between a job and another job, while the user waits for the completion of the printing job.

DESCRIPTION OF THE DRAWINGS

FIG. 6 is a flowchart illustrating an example of an operation of the adjustment unit.

FIG. 7A is a diagram illustrating a performance state of the known color deviation control.

FIG. 7B is a diagram illustrating an example of a performance state (performed every predetermined time) of a color deviation control of the first embodiment.

DETAILED DESCRIPTION

Hereinafter, an image processing apparatus includes an image forming unit, an adjustment unit, an image control unit, a sensor, a deviation amount calculating unit, and a determination unit. The image forming unit forms an image. The adjustment unit forms one set of a plurality of predetermined images as one set in toner output of colors, and adjusts the color deviation on the basis of the plurality of formed predetermined images. The image control unit controls the image forming unit to form a lesser number of predetermined images than the number of predetermined images formed by the adjustment unit. The sensor detects the predetermined images formed on the basis of control of the image control unit by the image forming unit. The deviation amount calculating unit calculates the deviation amount on the basis of the predetermined images detected by the sensor. The determination unit acquires a regulation value from a memory unit, determines whether or not color deviation occurs on the basis of the deviation amount calculated by the deviation amount calculating unit and the regulation value, controls the adjustment unit not to adjust the color deviation when the determination result is negative, and controls the adjustment unit to adjust the color deviation when the determination result is positive.

Herein, an overview of an embodiment will be described. An image processing apparatus of the embodiment checks whether or not there is color deviation, before adjusting color deviation. The image processing apparatus of the embodiment controls color deviation to be adjusted when the result of the checking is not satisfactory, and controls color deviation not to be adjusted when the result of the checking is satisfactory.

Hereinafter, embodiments will be described with reference to the drawings.

First Embodiment

Figure 1:
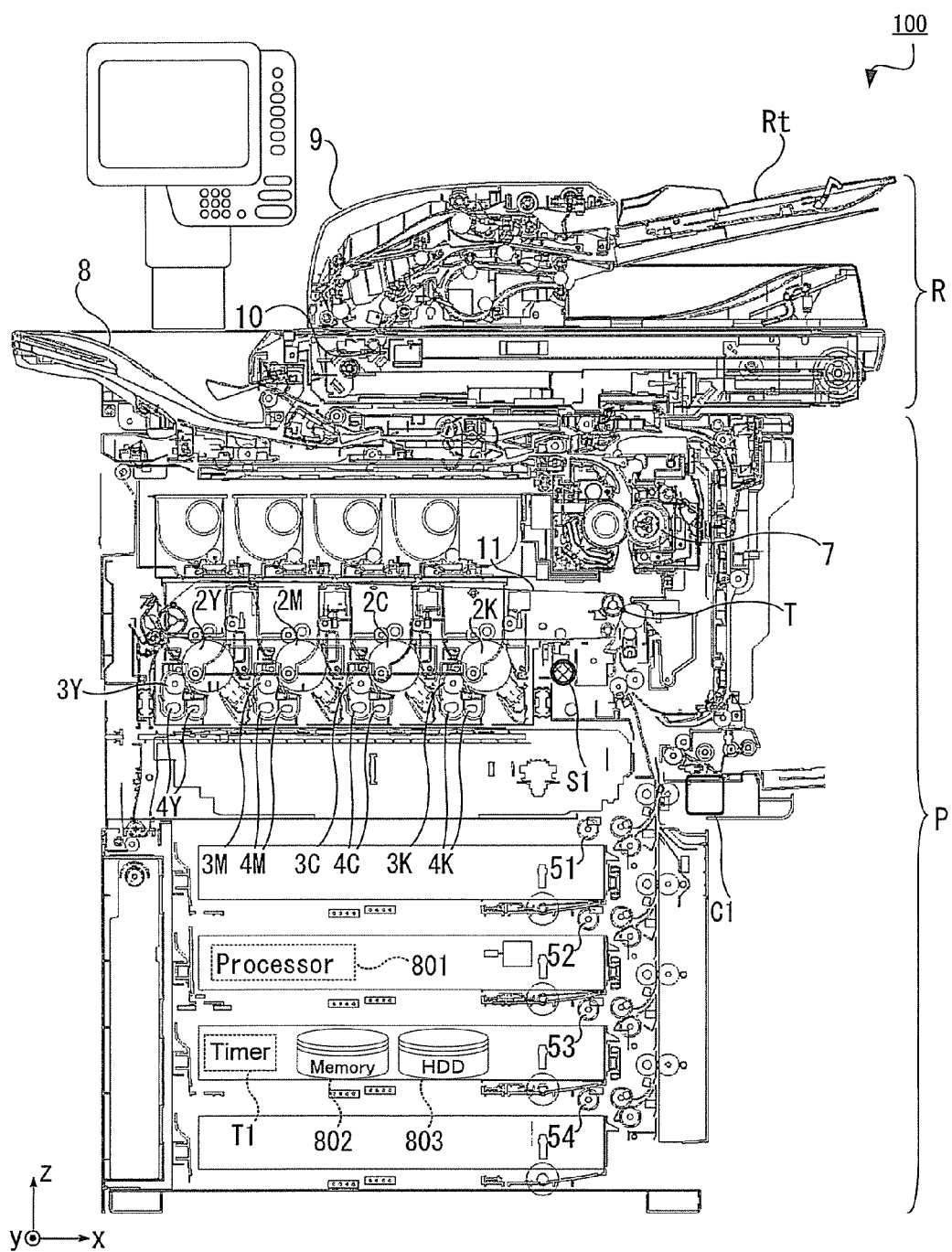
FIG. 1 is a cross-sectional view illustrating a configuration of an image processing apparatus.

FIG. 1 is a longitudinal cross-sectional view illustrating a schematic configuration of an image processing apparatus (MFP: Multi Function Peripheral) of a first embodiment.

As shown in FIG. 1, the image processing apparatus 100 includes an image reading unit R, and an image forming unit P.

The image reading unit R has a function of scanning and reading images of sheet documents and book documents.

The image forming unit P has a function of forming a development agent image on a sheet on the basis of the image read from the document by the image reading unit R and image data transmitted from an external apparatus to the image processing apparatus.

The image reading unit R includes an automatic document transporting device (ADF: Auto Document Feeder) 9 capable of automatically transporting the document to a predetermined image reading position, and images of documents automatically transported by the automatic document transporting device 9 and placed on a document tray Rt or documents placed on a document base (not shown) are read by a scanning optical system 10.

The image forming unit P includes pickup rollers 51 to 54, photoreceptors 2Y to 2K, development rollers 3Y to 3K, mixers 4Y to 4K, an intermediate transfer belt 11, a fixing device 7, and a discharge tray 8.

The image processing apparatus 100 includes a processor 801 that is an operation processing device (e.g., CPU (Central Processing Unit)), a memory 802 that is a memory device, and a HDD (Hard Disk Drive) 803. The processor 801 has a role of performing various processes in the image processing apparatus, and also has a role of realizing various functions by executing programs stored in the memory 802. The memory 802 may be formed of a RAM (Random Access Memory), a ROM (Read Only Memory), a DRAM (Dynamic Random Access Memory), an SRAM (Static Random Access Memory), a VRAM (Video RAM), and the like, and has a role of storing various kinds of information and programs used in the image processing apparatus 100.

The HDD 803 stores necessary data and programs stored in a non-volatile manner. A function realized using the processor 801, the memory 802, and the HDD 803 may be realized by mounting an ASIC (Application Specific Integrated Circuit).

Hereinafter, as an example of a process of the image processing apparatus 100, an overview of a copy process will be described.

First, a sheet picked up from a cassette by the pickup rollers 51 to 54 is supplied into a sheet transport path. The sheet supplied into the sheet transport path is transported in a predetermined transport direction by a plurality of roller pairs.

Images of a plurality of sheet documents which are continuously and automatically transported by the automatic document transporting device 9 are read at a predetermined image reading position by the scanning optical system 10.

Then, electrostatic latent images are formed on photosensitive faces of photoreceptors 2Y, 2M, 2C, and 2K for transferring development agent images of yellow (Y), magenta (M), cyan (C), and black (K) on the sheet on the basis of image data of the images read from the documents by the image reading unit R.

Subsequently, a development agent mixed by the mixers 4Y to 4K in a developing device is supplied to the photoreceptors 2Y to 2K on which the electrostatic latent images are formed as described above by the development rollers (commonly called magnetic rollers) 3Y to 3K. Accordingly, the electrostatic latent images formed on the photosensitive faces of the photoreceptors are developed.

The development agent images formed on the photoreceptors as described above are transferred to a belt face of the intermediate transfer belt 11 (commonly called primary transfer), the development agent images transported by rotation of the intermediate transfer belt are transferred onto the transported sheets at a predetermined secondary transfer position T.

The development agent images transferred onto the sheet are heated and fixed on the sheets by the fixing device 7.

The sheets on which the development agent images are heated and fixed are transported in the transport path by the plurality of transport roller pairs, and are sequentially discharged on the discharge tray 8.

The image forming unit P forms a color deviation amount detecting pattern on the intermediate transfer belt 11 according to control from an image control unit 22 to be described later. A positioning sensor S1 that is a sensor detecting the pattern is provided on the front side and the rear side (different positions in the Y-axis direction) of the image processing apparatus 100. The positioning sensor S1 vertically irradiates the transport face of the intermediate transfer belt 11, and detects whether or not the pattern passes therethrough.

The image processing apparatus 100 includes a counter C1 counting the number of processed copies and a timer T1 measuring time.

Figure 2:
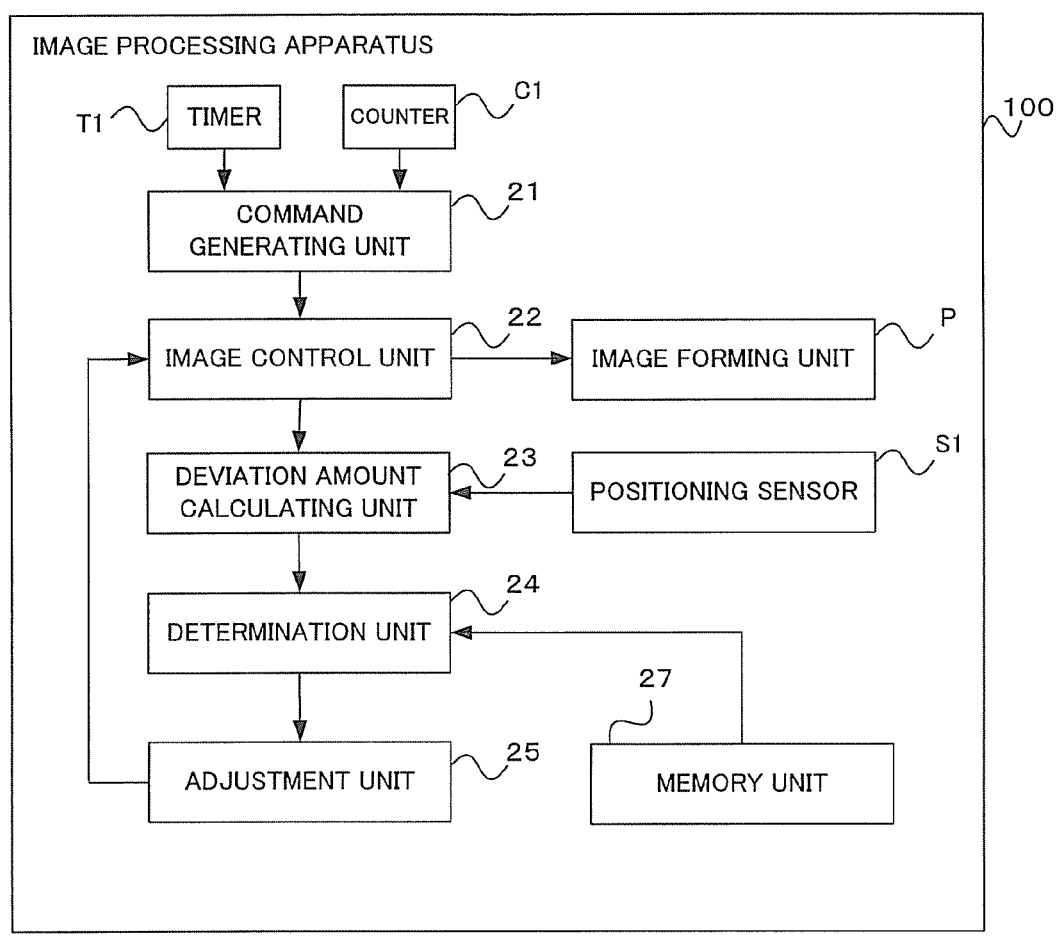
FIG. 2 is a block diagram of an image processing device of a first embodiment.

Next, an example of functional blocks of the image processing apparatus 100 is shown in FIG. 2. The image processing apparatus 100 includes a command generating unit 21, an image control unit 22, a deviation amount calculating unit 23, a determination unit 24, and an adjustment unit 25, in addition to the timer T1, the counter C1, the image forming unit P, and the positioning sensor S1 as described above. The units are realized by loading programs stored in advance in the HDD 803 to the memory 802 and operating the loaded programs by the processor 801.

In the following description, yellow is called Y color, cyan is called C color, magenta is called M color, and black is called K color.

The command generating unit 21 frequently acquires the measurement result of the timer T1, and instructs the image control unit 22 to form a pattern at a constant cycle on the basis of the acquired measurement result. The command generating unit 21 frequently acquires the number of printing-processed copies from the counter C1, and instructs the image control unit 22 to form a pattern whenever the count of the number of printing-processed copies reaches a predetermined number from the previous instruction.

The image control unit 22 controls the previous printing, acquires a performance instruction from the command generating unit 21, and outputs an instruction to form a wedge pattern on the intermediate transfer belt 11 to the image forming unit P.

Figure 3:
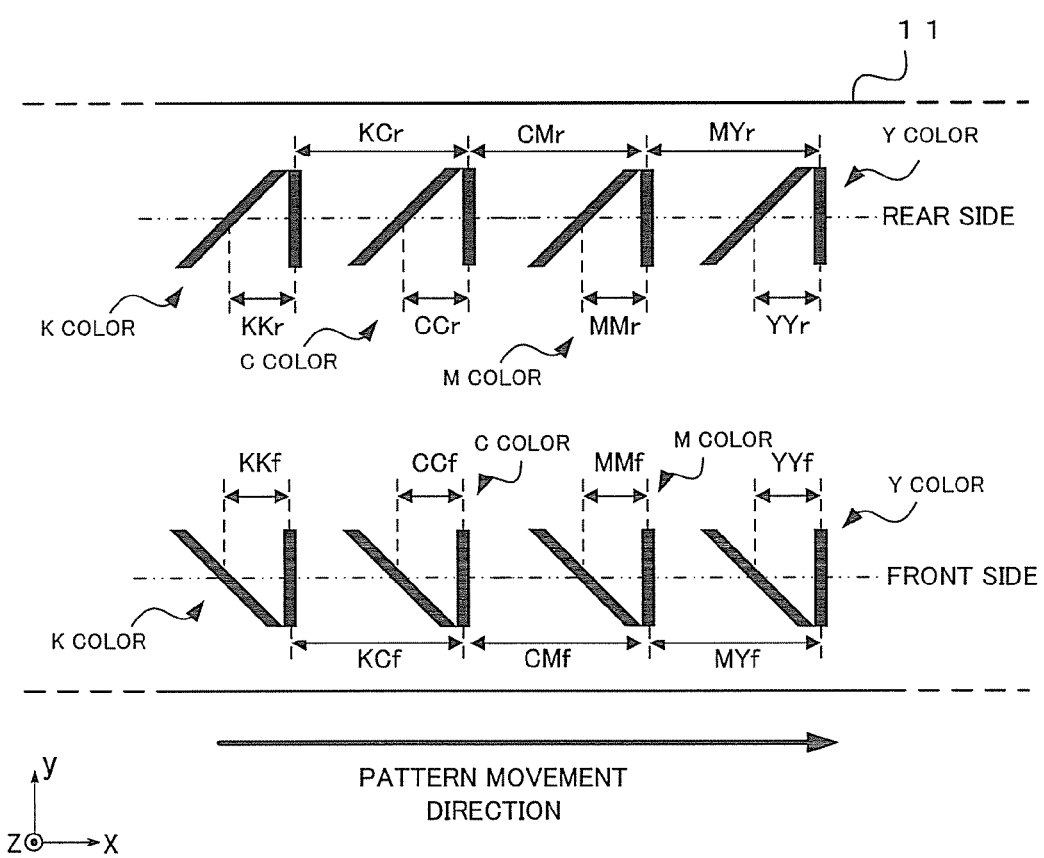
FIG. 3 is a diagram illustrating a set of wedge patterns and a detection line of a positioning sensor.

FIG. 3 shows one set of wedge patterns (a predetermined image). The wedge patterns are arranged and formed to be Y color, M color, C color, and K color sequentially from the movement direction upstream side of the face of the intermediate transfer belt 11, and are formed on the rear side and the front side.

The deviation amount calculating unit 23 measures a length (dot unit) between specific parts of the patterns formed by the image control unit 22 or detection timing, and calculates the deviation amount (deviation amounts of skew deviation amount, sub-scanning position deviation amount, main scanning magnification deviation amount, and main scanning position deviation amount) from the length. The deviation is a meaning that each color does not overlap.

Hereinafter, the measurement of the length will be described. As shown in FIG. 3, the positioning sensor S1 irradiates the center of the wedge patterns along with the rear side and the front side (two-dotted chain line of FIG. 3 is the irradiation line). The deviation amount calculating unit 23 acquires a detection signal from the positioning sensor S1, and measures the length between specific parts which are intersection points of the center line and the wedge patterns. In the example shown in FIG. 3, in the case of the rear side, lengths of YYr, MYr, MMr, CMr, CCr, KCr, and KKr are measured, and in the case of the front side, lengths are measured in the same manner. The deviation amount calculating unit 23 measures the length between the specific parts using an interval of the passing times of the specific parts detected by the positioning sensor S1, and a movement speed (parameter) of the intermediate transfer belt 11. The deviation amount calculating unit 23 acquires the detection timings of the rear side and the front side of the positioning sensor S1, and calculates the deviation amounts considering the detection timing (e.g., when the detection timing is declined to the rear side and the front side, skew deviation occurs). The method of calculating the deviation amounts from the length or the detection timing is based on a known technique.

The determination unit 24 acquires a regulation value (parameter) from the memory unit 27, and determines whether or not color deviation occurs according to the deviation amount calculated by the deviation amount calculating unit 23 and the regulation value. The regulation values of the deviation amounts are stored in advance in the memory unit 27, the determination unit 24 compares the deviation amount calculated by the deviation amount calculating unit 23 with the regulation value to determine whether or not color deviation occurs.

The determination unit 24 controls the adjustment unit 25 not to adjust color deviation when the determination result is satisfactory, and controls the adjustment unit 25 to adjust color deviation when the determination result is not satisfactory.

The adjustment unit 25 forms a plurality of sets of wedge patterns (see FIG. 3) formed of one set in toner output of C color, M color, Y color, and K color on the intermediate transfer belt 11. The adjustment unit 25 adjusts color deviation according to the plural sets of formed patterns. The adjustment unit 25 calculates the deviation amounts of the skew deviation amount, the sub-scanning position deviation amount, the main scanning magnification deviation amount, and the main scanning position deviation amount according to the plurality of wedge patterns, and adjusts color deviation according to the calculated deviation amounts.

Figure 4A:
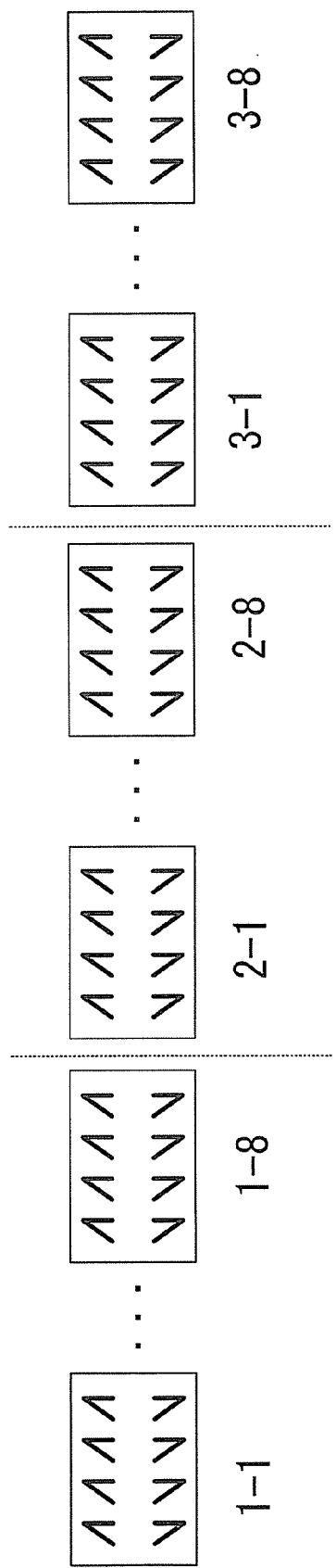
FIG. 4A is a diagram illustrating patterns printed by an adjustment unit.

The number of patterns formed at the time of the adjustment of the adjustment unit 25, and the number of wedge patterns formed when the image control unit 22 receives the performance instruction from the command generating unit 21 (hereinafter, referred to as checking time) will be described. FIG. 4A shows the wedge patterns formed at the time of the adjustment of the adjustment unit 25. The adjustment unit 25 performs a process with 3 phases, and forms 8 sets of wedge patterns on the intermediate transfer belt 11 for each phase. Accordingly, the adjustment unit 25 forms the maximal 24 sets of wedge patterns of 1-1 to 1-8, 2-1 to 2-8, and 3-1 to 3-8 shown in FIG. 4A.

Figure 4B:
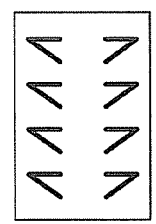
FIG. 4B is a diagram illustrating a pattern printed when an image control unit receives an instruction from a command generating unit.

The pattern formed at the checking time of check by the image control unit 22 is shown in FIG. 4B. At the check time, the image control unit 22 controls the image forming unit P to form one set of the same pattern as the wedge pattern formed by the adjustment unit 25 on the intermediate transfer belt 11 in principle.

Figure 5:
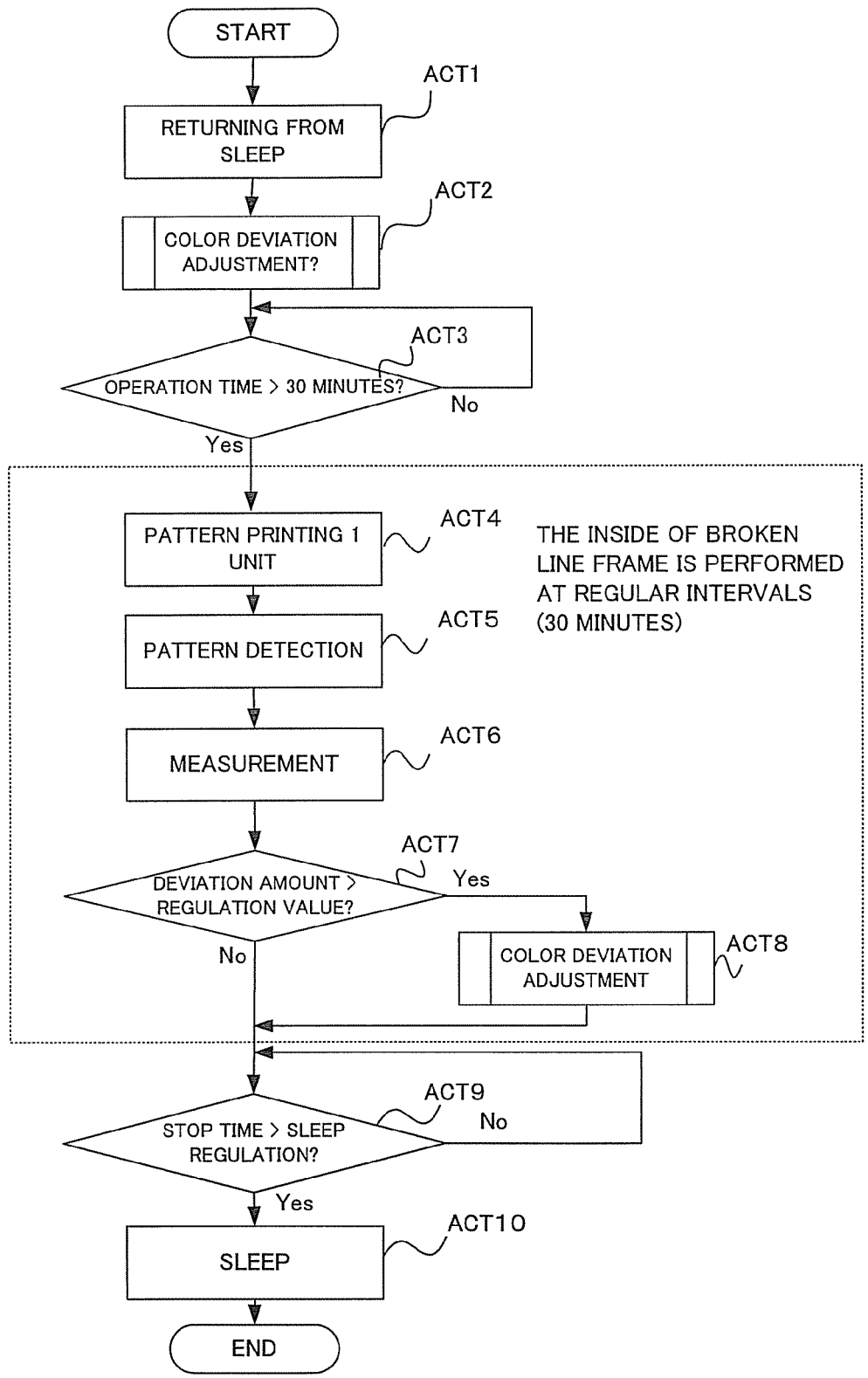
FIG. 5 is a flowchart illustrating an example of an operation of the image processing apparatus of the embodiment.

The operation of the image processing apparatus 100 will be described with reference to the flowchart shown in FIG. 5. The flowchart shown in FIG. 5 shows an example in which the command generating unit 21 outputs a performance instruction when a regular time elapses on the basis of the measurement result of the timer T1. In addition to this example, the command generating unit 21 may output the instruction when a regular number of copies (e.g., 100 copies) are processed after the previous performance instruction is output, on the basis of the measurement result of the counter C1.

When the image processing apparatus 100 returns from the sleep state (ACT1), the adjustment unit 25 adjusts color deviation therein (ACT2). The command generating unit 21 determines whether or not a regular time (e.g., 30 minutes) elapses from the sleep return of the image processing apparatus 100 on the basis of the measurement result of the timer T1 (ACT3). When the regular time elapses (ACT3: Yes), the command generating unit 21 outputs the performance instruction to the image control unit 22.

The image control unit 22 receiving the performance instruction controls the image forming unit P to form one set of wedge patterns on the intermediate transfer belt 11 (ACT4). The positioning sensor S1 detects one set of wedge patterns formed on the intermediate transfer belt 11 (ACT5), and the deviation amount calculating unit 23 measures the lengths shown in FIG. 3 and timings, and calculates the deviation amounts (ACT6).

The determination unit 24 acquires the deviation amounts (hereinafter, referred to as actual measurement values) calculated by the deviation amount calculating unit 23, acquires the regulation values corresponding to the actual measurement values from the memory unit 27, and compares the actual measurement values with the regulation values (ACT7). When there is at least one value exceeding the regulation value of the actual measurement values (ACT7: Yes), the determination unit 24 outputs the performance instruction to the adjustment unit 25, and the adjustment unit 25 acquires the instruction and adjusts color deviation (ACT8). Meanwhile, when there is no actual measurement value exceeding the regulation value (ACT7: No), the determination unit 24 does not output the performance instruction to the adjustment unit 25 to control the adjustment unit 25 not to perform the process. In ACT7, the case where there is at least one value exceeding the regulation value of the actual measurement values is determined as unsatisfactory. However, the determination unit 24 may determine a case where a plurality of values of the actual measurement values exceed the regulation value as unsatisfactory, and the corresponding coefficient may be multiplied for each actual measurement value to compare the multiplied value with the regulation value.

The processes from ACT4 to ACT8 are performed at each regular interval (30 minutes) on the basis of the control of the command generating unit 21.

When the image processing apparatus 100 does not perform any process (the original copy process or FAX transmission and reception process of the image processing apparatus) during a regular time (ACT9: Yes), the image processing apparatus 100 enters the sleep state (ACT10).

Next, the operations of the adjustment unit 25 in ACT2 and ACT8 will be described with reference to the flowchart shown in FIG. 6. The adjustment unit 25 may be realized by combining the functions of the image control unit 22, the image forming unit P, the deviation amount calculating unit 23, the positioning sensor S1, and the determination unit 24.

The adjustment unit 25 forms 8 sets of wedge patterns on the intermediate transfer belt 11, and performs a detection process and a measurement process of the 8 sets of patterns using the positioning sensor S1 (ACT11). The adjustment unit 25 calculates values of the deviation amounts such as skew deviation amounts on the basis of the measurement result, and calculates differences between the values of the calculated deviation amount and the regulation values of the deviation amounts stored in the memory unit 27 to check the deviation amounts (ACT12). The adjustment unit 25 feeds back the calculated differences as setting values for adjustment (ACT13). Control precision of the image control unit 22 or the output to the sheet of the image forming unit P increases in precision according to the feedback.

The adjustment unit 25 performs the same processes as ACT11 and ACT12 to form 8 sets of wedge patterns on the intermediate transfer belt 11, performs the detection process and the measurement process of the 8 sets of patterns, and calculates values of the deviation values (ACT14). The adjustment unit 25 compares the calculated values of the deviation amounts with the regulation values to determine whether or not the values are proper (ACT15). When the values are proper (ACT15: Yes), the process is ended. When the values are not proper (ACT15: No), the adjustment unit 25 forms, in the same manner as ACT14, 8 sets of wedge patterns on the intermediate transfer belt again, performs the detection process and the measurement process of the 8 sets of patterns, and calculates values of the deviation amounts (ACT17). Thereafter, the adjustment unit 25 corrects the deviation amounts (ACT18). In ACT18, differences between the values calculated in the same manner as ACT12 and the regulation values are calculated, and the difference values calculated in the same manner as ACT13 are fed back as setting values for adjustment.

FIG. 7A shows the known model of the color deviation adjustment. FIG. 7A is a diagram illustrating a use state of one day as a model, and the horizontal axis is the time axis (8:00 to 17:00). In the known model, the color deviation is adjusted as shown in the flowchart of FIG. 6 (see the black rectangle shown in FIG. 7A) when returning from the sleep state and when 30 minutes elapses. Accordingly, the adjustment of color deviation is performed a total of 16 times. Since about 40 seconds are necessary for one color deviation adjustment, 640 seconds per day are wasted in the color deviation adjustment process. A maximum of 24 sets of wedge patterns are formed for one performance, and a maximum of 384 sets of wedge patterns are formed in one day. A corresponding amount of toner is consumed.

FIG. 7B shows a model of color deviation adjustment by the operation shown in the flowchart of FIG. 5 described above. The color deviation is checked at the same timing as that of the color deviation control at a regular time interval (see oblique line rectangle of FIG. 7B). One performance of this check takes about 3 seconds since the image is formed with only one set of patterns. There is a case where color deviation due to thermal expansion of composition components in the units related to the image forming such as the LSU, EPU, and TBU in the image processing apparatus occurs. In this case, since extreme changes of temperature do not occur at the normal using time of the image processing apparatus, drastic color deviation does not particularly occur. Accordingly, in the example shown in FIG. 7B, it is assumed that the color deviation adjusting process is performed once per about half day (see the black rectangle of FIG. 7B).

In this condition, when the necessary time for each day is estimated, it is 202/640=about 32% as compared with the known technique, and when the amount of consumed toner is estimated with a unit ratio of patterns, it is 110/384=about 29%. Accordingly, it is possible to reduce the cost by 30% as compared with the known technique. Image quality caused by color deviation is checked at a regular time interval, the color deviation is adjusted as necessary, and thus it is possible to maintain image quality corresponding to that of the known technique.

As application of the above description, when the actual measurement value calculated by the deviation amount calculating unit 23 gets closer to the regulation value, it may be conceivable to control the time interval of the check to be shortened. An example of such a control will be described hereinafter.

A regulation value different from the above-described regulation value is additionally stored in the memory unit 27. The new regulation value is a first regulation value herein. In the embodiment, the first regulation value is smaller than the regulation value, but may be a larger value or the same value. In ACT7, the determination unit 24 also acquires the first regulation value from the memory unit 27, and determines whether or not color deviation occurs on the basis of the actual measurement value calculated by the deviation amount calculating unit 23 and the first regulation value. The determination method is the same as ACT7.

When it is determined that the actual measurement value exceeds the first regulation value, the determination unit 24 outputs an instruction to change the time interval to the command generating unit 21. The command generating unit 21 receiving the instruction to change the time interval instructs the image control unit when a period (e.g., 15 minutes) shorter than the regular period passes (in the above-described example, 30 minutes elapse).

In the above-described example, the image control unit 22 forms only one set of wedge patterns on the intermediate transfer belt 11 at the check time. When the value calculated by the deviation amount calculating unit 23 gets closer to the regulation value, it is conceivable that the image control unit 22 increases the number of formed wedge patterns to perform a more detailed check.

An example of such a control will be described. The above-described first regulation value is stored in the memory unit 27, and the determination unit 24 further acquires the first regulation value in the process of ACT7, and compares the actual regulation value calculated by the deviation amount calculating unit 23 with the first regulation value. When it is determined that the actual measurement value exceeds the first regulation value, the determination unit 24 outputs an instruction to print a plurality of sets to the image control unit 22. The image control unit 22 receiving the instruction to print the plurality of sets controls the image forming unit P to form, for example, 2 sets of wedge patterns from next, and the deviation amount calculating unit 23 and the determination unit 24 also perform the process on each of sets of wedge patterns. When there is at least one value exceeding the regulation value of the actual measurement values of the 2 sets, the determination unit 24 outputs the performance instruction to the adjustment unit 25.

Second Embodiment

In the image processing apparatus in which the printing process is frequently performed, color deviation frequently occurs, and thus the color deviation adjusting process is frequently performed. When the printing process is frequently performed, it thought that a user is also busy. When the color deviation adjusting process occurs, the user is in a waiting state. Accordingly, particularly, when the user is very busy, it is necessary to suppress occurrence of the frequent color deviation adjusting process.

In the second embodiment, an aspect of controlling the color deviation adjusting process to be performed according to use frequency will be described. That is, in the second embodiment, a case where the plurality of regulation values used in ACT7 of the first embodiment is stored in the memory unit 27 and the regulation values are switched according to the use frequency of an image processing apparatus used by the user will be described.

Figure 8:
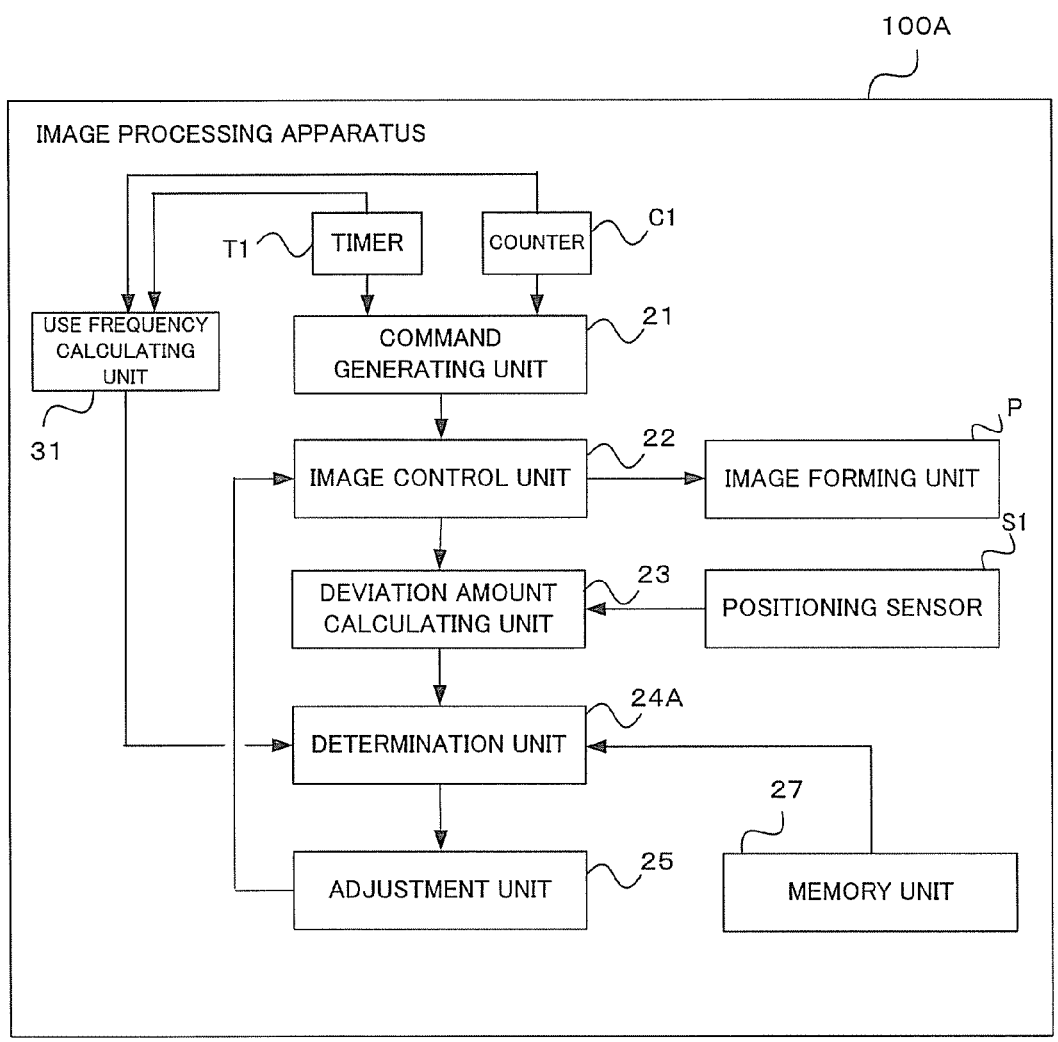
FIG. 8 is a block diagram illustrating an image processing apparatus of a second embodiment.

FIG. 8 is a block diagram of the image processing apparatus of the second embodiment. The image processing apparatus 100A further includes a use frequency calculating unit 31 in addition to the image processing apparatus 100 of the first embodiment. The image processing apparatus 100A includes a determination unit 24A acquiring the calculation result of the use frequency calculating unit 31 and acquiring the regulation value according to the acquired calculation result from the memory unit 27 in addition to the function of the determination unit 24 described in the first embodiment. The units and hardware configurations except for the use frequency calculating unit 31 and the determination unit 24A are the same as that of the first embodiment.

The use frequency calculating unit 31 acquires the measurement results of the timer T1 and the counter C1, calculates a use frequency value by calculating the number of printed copies within a regular time such as a unit of minute and a unit of 1 hour, and outputs the use frequency value to the determination unit 24A after the calculating.

The determination unit 24A acquires the regulation value according to the use frequency value acquired from the use frequency calculating unit 31 from the memory unit 27, and determines the actual measurement value from the deviation amount calculating unit 23 using the acquired regulation value. The use frequency value and the regulation value are associated and stored in the memory unit 27. In the embodiment, they are associated such that the regulation value gets larger as the use frequency value gets larger.

The operation of the image processing apparatus 100A will be described. The use frequency calculating unit 31 periodically calculates the use frequency value, and outputs it to the determination unit 24A. In ACT7 of FIG. 5, the determination unit 24A acquires the regulation value corresponding to the use frequency value from the memory unit 27, and determines the actual measurement value from the deviation amount calculating unit 23 using the acquired regulation value. The processes except for this operation are the same as the flowchart shown in FIG. 5.

Third Embodiment

In the first and second embodiments, the aspect of performing the color deviation check when the regular time elapses or when the predetermined number of copies are processed was described. Although described in the first embodiment, there is a case where a support member of a mirror is affected by heat to cause color deviation. Accordingly, in the third embodiment, an aspect in which a temperature sensor detects the current temperature of a heat emitting element such as the fixing device 7 and a driving motor of a polygon mirror, and the color deviation check is performed when the temperature exceeds a predetermined value will be described.

Figure 9:
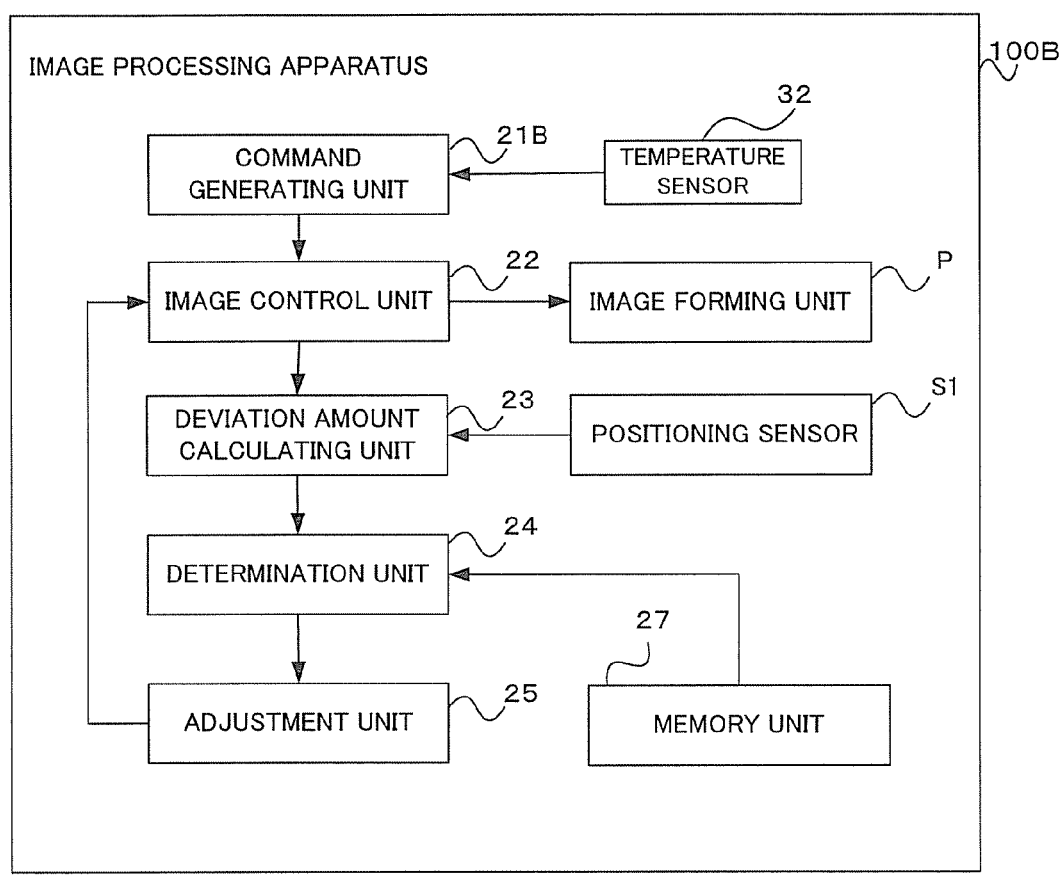
FIG. 9 is a block diagram illustrating an image processing apparatus of a third embodiment.

A configuration of an image processing apparatus of the third embodiment will be described with reference to FIG. 9. The image processing apparatus 100B includes a temperature sensor 32 detecting the temperature of the heat emitting element in addition to the configuration of the first embodiment. A command generating unit 21B frequently acquires the temperature value detected by the temperature sensor 32, and outputs a performance instruction to the image control unit 22 when the value exceeds a threshold value. The units other than these are the same as the first embodiment. The image processing apparatus 100B shown in FIG. 9 does not include the timer T1, the counter C2, and the use frequency calculating unit 31 described in the first and second embodiments, but may include them.

Figure 10:
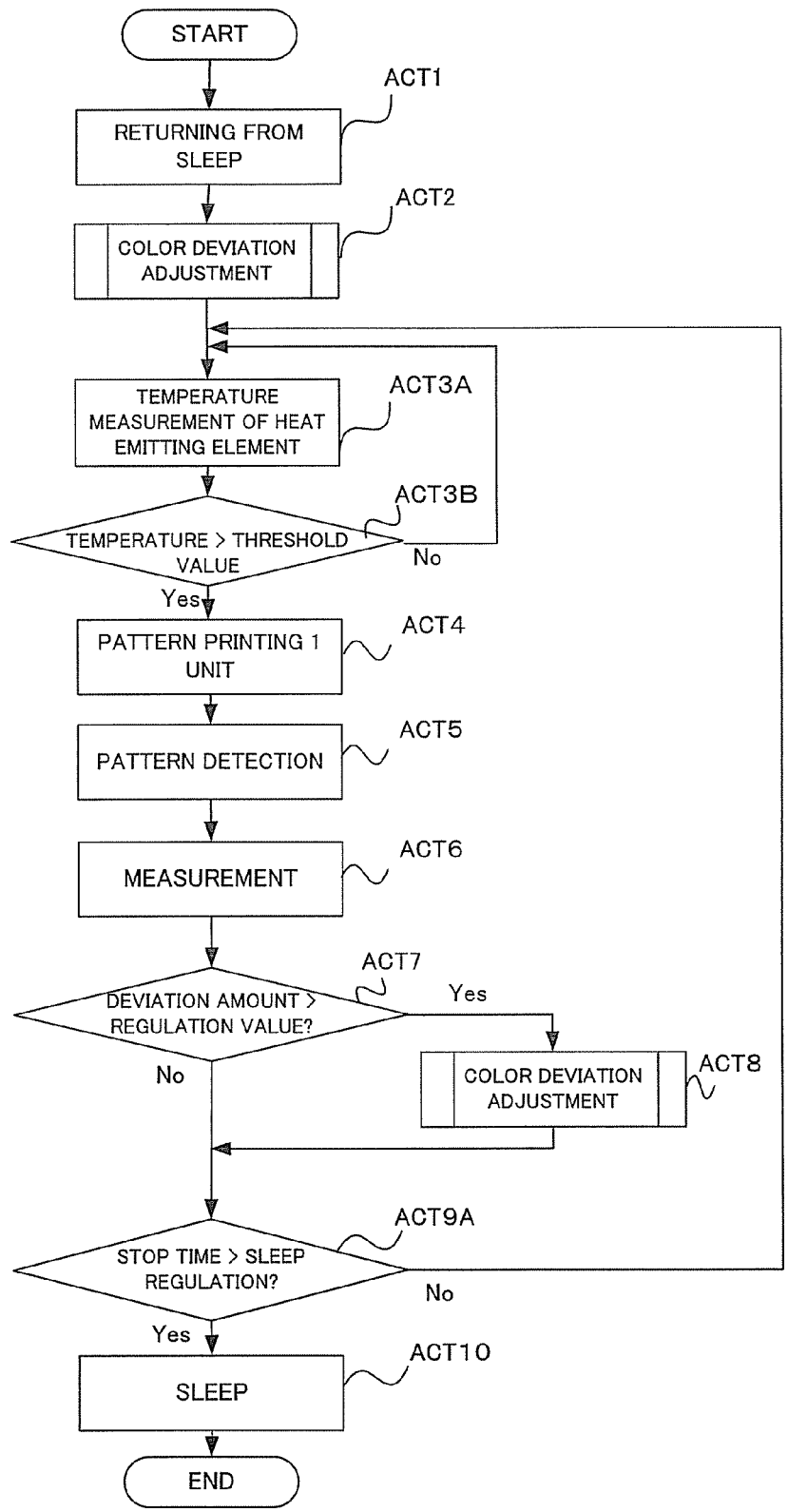
FIG. 10 is a flowchart illustrating an example of an operation of the image processing apparatus of the third embodiment.

The operation of the image processing apparatus 100B will be described with reference to FIG. 10. In FIG. 10, since the same reference numerals and signs as FIG. 3 are the same as the first embodiment, the description thereof is omitted.

In ACT2, after the color deviation adjusting process is performed, the temperature sensor 32 frequently measures temperature of the heat emitting element, and outputs the measurement result to the command generating unit 21B (ACT3A). ACT3A and ACT3B are repeatedly performed until the measurement temperature of the temperature sensor 32 exceeds the threshold value (ACT3B: No). When the measurement temperature exceeds the threshold value (ACT3B: Yes), the command generating unit 21B outputs a check performance instruction to the image control unit 22. The threshold value used herein is stored in advance in the memory unit 27.

Thereafter, in the same manner as the first embodiment, ACT4 to ACT8 are performed. When the image processing apparatus 100B does not satisfy the condition of entering the sleep state described in ACT9 of the first embodiment (ACT9A: No), the process returns to ACT3A.

As described above, according to the technique described in this specification, the color deviation adjusting process is controlled to be performed at the optimal time, such that the toner consumption is suppressed, the interruption time of job can be minimal, and it is possible to secure advantages for the user.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image processing apparatus comprising:
an image forming unit that forms an image;
an adjustment unit that forms one set of a plurality of predetermined images as one set in toner output of colors, and adjusts color deviation on the basis of the plurality of formed predetermined images;
an image control unit that controls the image forming unit to form a lesser number of predetermined images than the number of predetermined images formed by the adjustment unit;
a sensor that detects the predetermined images formed on the basis of control of the image control unit by the image forming unit;
a deviation amount calculating unit that calculates a deviation amount on the basis of the predetermined images detected by the sensor;
a determination unit that acquires a regulation value from a memory unit, determines whether or not color deviation occurs on the basis of the deviation amount calculated by the deviation amount calculating unit and the regulation value, controls the adjustment unit not to adjust the color deviation when the determination result is negative, and controls the adjustment unit to adjust the color deviation when the determination result is positive;
a counter that counts the number of printing copies; and
a performance instructing unit that acquires the count value of the counter and instructs the image control unit to form a predetermined image when the count value reaches a predetermined value from an output of the previous instruction, and the image control unit controls the image forming unit to form the predetermined image by the instruction from the performance instructing unit, and the deviation amount calculating unit and the determination unit are associated with the image control unit.

2. The apparatus according to claim 1, wherein the image control unit controls the image forming unit to form one predetermined image.

3. The apparatus according to claim 1, further comprising:
a timer that measures time; and
a performance instructing unit that acquires the measurement result of the timer and instructs the image control unit to form a predetermined image at a constant cycle based on the measurement result, wherein the image control unit controls the image forming unit to form the predetermined image by the instruction from the performance instructing unit, and the deviation amount calculating unit and the determination unit are associated with the image control unit.

4. The apparatus according to claim 3, wherein the determination unit further acquires a first regulation value that is a regulation value of the same value as the regulation value or a different value from the memory unit, and determines whether or not the deviation amount calculated by the deviation amount calculating unit exceeds the first regulation value, and the performance instructing unit instructs the image control unit at a cycle different from the constant cycle when the determination result using the first regulation value by the determination unit is positive.

5. The apparatus according to claim 1, further comprising:
a temperature sensor that measures a temperature of a heat emitting element in the image processing apparatus; and
a performance instructing unit that instructs the image control unit to form a predetermined image when the temperature sensor measures a value over a predetermined temperature,
wherein the image control unit controls the image forming unit to form the predetermined image by the instruction from the performance instructing unit, and the deviation amount calculating unit and the determination unit are associated with the image control unit.

6. The apparatus according to claim 1, wherein the determination unit further acquires a first regulation value that is a regulation value of the same value as the regulation value or a different value from the memory unit, and determines whether or not the deviation amount calculated by the deviation amount calculating unit exceeds the first regulation value, and the image control unit controls the image forming unit to increase the number of formed predetermined images when the determination result using the first regulation value by the determination unit is positive.

7. The apparatus according to claim 1, further comprising a use frequency calculating unit that calculates use frequency of printing,
wherein the determination unit further acquires a regulation value based on the value of the use frequency calculated by the use frequency calculating unit from the memory unit, and determines whether or not color deviation occurs using the acquired regulation value.

8. The apparatus according to claim 1, wherein the adjustment unit further adjusts color deviation after returning from a sleep mode.

9. The apparatus according to claim 1, wherein the image forming unit forms a predetermined image on an intermediate transfer belt.

10. An image processing apparatus comprising:
an image forming unit that forms an image;
an adjustment unit that forms one set of a plurality of predetermined images as one set in toner output of colors, and adjusts color deviation on the basis of the plurality of formed predetermined images;
an image control unit that controls the image forming unit to form a lesser number of predetermined images than the number of predetermined images formed by the adjustment unit;
a sensor that detects the predetermined images formed on the basis of control of the image control unit by the image forming unit;
a deviation amount calculating unit that calculates a deviation amount on the basis of the predetermined images detected by the sensor;
a determination unit that acquires a regulation value from a memory unit, determines whether or not color deviation occurs on the basis of the deviation amount calculated by the deviation amount calculating unit and the regulation value, controls the adjustment unit not to adjust the color deviation when the determination result is negative, and controls the adjustment unit to adjust the color deviation when the determination result is positive;
a temperature sensor that measures a temperature of a heat emitting element in the image processing apparatus; and
a performance instructing unit that instructs the image control unit to form a predetermined image when the temperature sensor measures a value over a predetermined temperature, and the image control unit controls the image forming unit to form the predetermined image by the instruction from the performance instructing unit, and the deviation amount calculating unit and the determination unit are associated with the image control unit.

11. The apparatus according to claim 10, wherein the image control unit controls the image forming unit to form one predetermined image.

12. The apparatus according to claim 10, further comprising:
a timer that measures time; and
a performance instructing unit that acquires the measurement result of the timer and instructs the image control unit to form a predetermined image at a constant cycle based on the measurement result,
wherein the image control unit controls the image forming unit to form the predetermined image by the instruction from the performance instructing unit, and the deviation amount calculating unit and the determination unit are associated with the image control unit.

13. The apparatus according to claim 12, wherein the determination unit further acquires a first regulation value that is a regulation value of the same value as the regulation value or a different value from the memory unit, and determines whether or not the deviation amount calculated by the deviation amount calculating unit exceeds the first regulation value, and the performance instructing unit instructs the image control unit at a cycle different from the constant cycle when the determination result using the first regulation value by the determination unit is positive.

14. The apparatus according to claim 10, further comprising:
a counter that counts the number of printing copies; and
a performance instructing unit that acquires the count value of the counter and instructs the image control unit to form a predetermined image when the count value reaches a predetermined value from an output of the previous instruction,
wherein the image control unit controls the image forming unit to form the predetermined image by the instruction from the performance instructing unit, and the deviation amount calculating unit and the determination unit are associated with the image control unit.

15. The apparatus according to claim 10, wherein the determination unit further acquires a first regulation value that is a regulation value of the same value as the regulation value or a different value from the memory unit, and determines whether or not the deviation amount calculated by the deviation amount calculating unit exceeds the first regulation value, and the image control unit controls the image forming unit to increase the number of formed predetermined images when the determination result using the first regulation value by the determination unit is positive.

16. The apparatus according to claim 10, further comprising a use frequency calculating unit that calculates use frequency of printing, wherein the determination unit further acquires a regulation value based on the value of the use frequency calculated by the use frequency calculating unit from the memory unit, and determines whether or not color deviation occurs using the acquired regulation value.

17. The apparatus according to claim 10, wherein the adjustment unit further adjusts color deviation after returning from a sleep mode.

18. The apparatus according to claim 10, wherein the image forming unit forms a predetermined image on an intermediate transfer belt.

\* \* \* \* \*